United States Patent Office 3,780,174
Patented Dec. 18, 1973

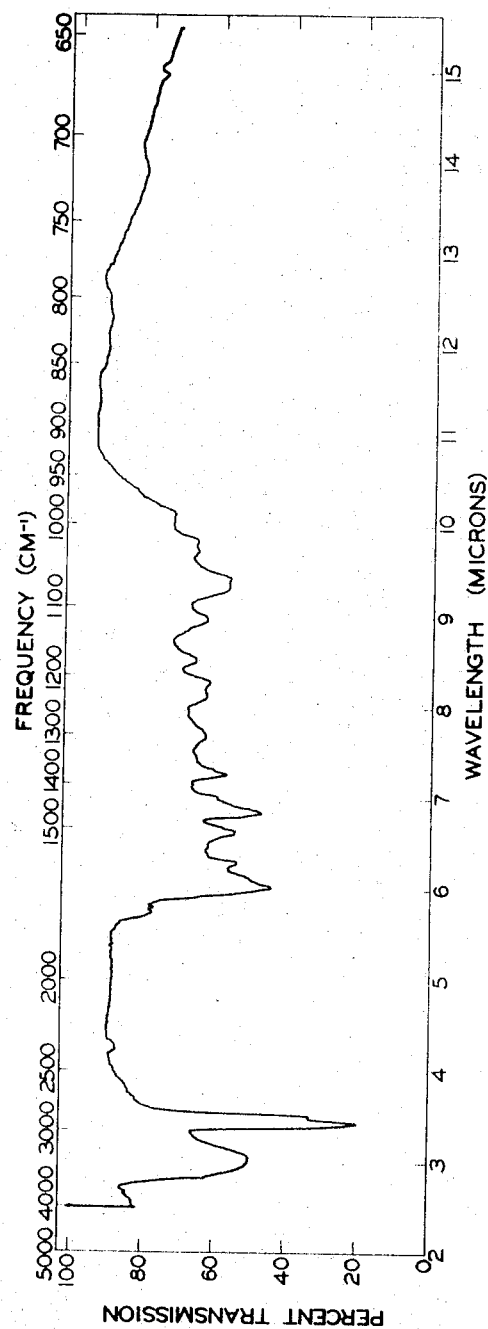

3,780,174
ANTIBIOTIC A477 AND PROCESS FOR PREPARATION THEREOF
Robert L. Hamill, New Ross, Michael E. Haney, Jr., West Lafayette, and William Max Stark, Indianapolis, Ind., assignors to Eli Lilly and Company, Indianapolis, Ind.
Filed Oct. 27, 1971, Ser. No. 192,838
Int. Cl. A61k 21/00
U.S. Cl. 424—118                      3 Claims

ABSTRACT OF THE DISCLOSURE

The basic, nitrogenous antibiotic A477 produced by culturing Actinoplanes sp. NRRL 3884 under submerged aerobic fermentation conditions forms crystalline salts with mineral and organic acids which as the free base or as such salts inhibits the growth of microorganisms. A477 and salts thereof are particularly useful in controlling the growth of cariogenic organisms and additionally are useful in promoting the growth of chickens.

BACKGROUND OF THE INVENTION

Periodontal disease and dental caries are among the continuing health problems of mankind. Certain microorganisms are associated with the formation of dentobacterial plaques which are conducive to carious lesions or periodontal lesions or both. Although some known antibiotics are effective in inhibiting these microorganisms, there remains a need for more effective agents.

SUMMARY OF THE INVENTION

This invention relates to a novel antibiotic substance and to a process for its production. In particular this invention relates to the basic, introgenous antibiotic arbitrarily designated herein as antibiotic A477 and to the acid addition salts thereof.

Antibiotic A477 is produced by culturing the newly characterized Actinoplanes sp. NRRL 3884 under submerged aerobic fermentation conditions until a substantial amount of antibiotic activity has been produced. The antibiotic is isolated from the filtered fermentation broth as a while amorphous solid preferably by column chromatography over activated carbon or alumina. Crystalline A477 salts such as the hydrochloride, sulfate and picrate are readily prepared in a conventional manner. Both the free base and salt forms of antibiotic A477 are useful antibacterials particularly in inhibiting the growth of cariogenic organisms such as Odontomyces viscosus and Streptococcus sp. A477 and the salts thereof also possess growth promoting activity when incorporated in the diet of chickens.

DETAILED DESCRIPTION

Antibiotic A477 is a basic antibiotic capable of forming salts in a conventional manner with mineral acids such as hydrochloric acid, sulfuric acid, phosphoric acid, and the like, and also with a variety of organic acids including acetic acid, propionic acid, malonic acid, succinic acid, tartaric acid, maleic acid, picric acid, benzoic acid, p-toluene sulfonic acid, nicotinic acid, and the like.

Antibiotic A477 as the free base is a white amorphous solid, having an elemental analysis as follows: 53.06 percent carbon, 6.18 percent hydrogen, 5.79 percent nitrogen, 31.40 percent oxygen and 3.39 percent chlorine. The specific rotation of antibiotic A477 is −66.6° when determined at a temperature of 25° C. in 50 percent aqueous methanol solution in which the concentration of the antibiotic is 1 percent on a weight per volume basis.

The hydrochloride salt of A477 is a white crystalline solid with a melting point of 207–212° C. It is soluble in warm water, and highly soluble in warm 50 percent aqueous methanol. The hydrochloride salt of A477 is stable in solution over a pH range of about pH 1–pH 10 at temperatures up to about 27° C. Electrometric titration of A477 hydrochloride in water indicates the presence of one group with a pK'a value of 6.2 and five or more groups with pK'a values between 8 and 10.5. Electrometric titration of A477 hydrochloride in dimethylformamide: water (2:1) indicates the presence of two groups with pK'a values of 7.0 and 9.7, respectively, and two or more groups with pK'a values above 11.

Molecular weight determination by a vapor pressure osmotic method indicates the minimum molecular weight of A477 hydrochloride to be approximately 1480.

An average of several elemental analyses has shown antibiotic A477 hydrochloride to have approximately the following composition: 55.36 percent carbon, 6.02 percent hydrogen, 5.73 percent nitrogen, 28.99 percent oxygen, 4.52 percent total chlorine and 1.28 percent inorganic chlorine.

The infrared absorption curve of the hydrochloride salt of A477 in a mineral oil mull is shown in the accompanying drawing. The following distinguishable absorption maxima are observed: 3.0, 5.8, 6.02, 6.3, 6.62, 6.84, 7.02, 7.26, 7.32, 7.7, 8.1, 8.27, 8.52, 8.97, 9.35, 9.7, 9.8, 10.1 microns.

The ultraviolet absorption spectrum of antibiotic A477 hydrochloride in acidic and neutral aqueous solution shows an absorption maximum at 283 m$\mu$ with an absorptivity value, of $$E_{1\,cm}^{1\%}$$

of 70. In basic solution A477 hydrochloride exhibits absorption maxima at 300 and 362 m$\mu$ with absorptivity values, $$E_{1\,cm}^{1\%}$$

of 60 and 53 respectively.

Antibiotic A477 hydrochloride shows the following $R_f$ values in the paper chromatography systems indicated below using Bacillus subtilis as a detection organism.

| $R_f$ value: | Solvent system |
|---|---|
| 0.05 | Butanol saturated with water. |
| 0.26 | Butanol saturated with water: 2% p-toluenesulfonic acid. |
| 0.84 | Methanol, 19 parts; acetone, 6 parts; water, 75 parts. |
| 0.40 | Methanol, 3 parts; 0.1 N HCl, 1 part. |
| 0.62 | Water saturated with methylisobutylketone; 1% p-toluenesulfonic acid. |

A477 has an inhibitory action against growth of certain microorganisms. The levels which show inhibition against the growth of illustrative organisms are set forth in Table I.

TABLE I

Antimicrobial activity of A477 hydrochloride

| Test organism: | Minimum inhibitory concentration (mcg./ml.) |
|---|---|
| Staphylococcus aureus | a 25.0 |
| Bacillus subtilis | a 1.56 |
| Mycobacterium avium | a 25.0 |
| Streptococcus faecalis | a 3.12 |
| Vibrio coli (Iowa 10) | b 25.0 |
| Mycoplasma gallisepticum | b 50.0 |
| Pasteurella multocida | b 50.0 |
| Pasteurella hemolytica | b 50.0 | a Agar dilution.
b Broth dilution.

The acute toxicity of A477 hydrochloride, determined in mice, and expressed as $LD_{50}$, is 350 mg./kg. when administered intraperitoneally.

A477 hydrochloride when given by subcutaneous injection to mice has in vivo antimicrobial action against infectious organisms, the $ED_{50}$ values (effective dose to protect 50 percent of the test animals) in illustrative infections being as follows when two doses are employed:

|  | Mg./kg. |
|---|---|
| Staphylococcus aureus 3055 | 83 |
| Streptococcus pyogenes | <1.0 |
| Diplococcus pneumoniae | <5.1 |

Another important property of antibiotic A477 is its ability to inhibit the growth of microorganisms contributing to the development of periodontal disease. In a broth dilution test, a concentration of 1.0 mcg./ml. of A477 hydrochloride inhibits the growth of the cariogenic organism *Odontomyces viscosus*.

A solution of A477 hydrochloride exhibits antimicrobial activity against cariogenic organisms as illustrated by the following test system: Tubes of nutrient broth containing 5 percent sucrose are inoculated with cariogenic microorganisms. Each tube is equipped with a narrow glass rod, inserted in the tube, and extending below the surface of the nutrient broth. After incubation at 37° C. overnight, a layer of plaque (primarily cells and dextran) forms on the surface of the rods. The rods are then transferred to solutions containing varying concentrations of the A477 hydrochloride, and the rods are allowed to remain in contact with the solution for 5, 10 and 15 minutes. After the appropriate time limit, the rods are rinsed with sterile, deionized water, and then the rods are incubated at 37° for 18-24 hours in uninoculated medium. Growth is detected by observing the color change of bromthymol blue from blue to yellow due to the acid production of the organism.

A solution of A477 hydrochloride at a concentration of 0.1% was effective against a cariogenic Streptococcus sp. when the solution was in contact with the cells for five minutes. The growth of another species of cariogenic Streptococcus was prevented by a 1% solution in contact with the cells for five minutes.

In a broth dilution test three species of cariogenic Streptococcus were inhibited by A477 hydrochloride at a concentration of 5 mcg./ml. Another species of cariogenic organism (filamentous-rod type) was inhibited by A477 hydrochloride at a concentration of 1 mcg./ml. in a broth dilution test.

Still another useful property of antibiotic A477 is its ability to promote growth in animals. When A477 hydrochloride was added to the diet of growing chicks at a level of 45.4 grams/ton, the average weight gain after ten days was 154.2 grams as compared with 147 grams for the control group. The feed conversion efficiency for the chickens fed the antibiotic A477 hydrochloride was 1.43 while the feed conversion efficiency for the control group was 1.53.

As is apparent from the foregoing properties of antibiotic A477, the antibiotic is useful for suppressing the growth of pathogenic organisms. Thus, for example, solutions containing appropriate concentrations of the antibiotic can be used to disinfect dental and surgical instruments, glassware and the like. The antibiotic can also be employed in solution to disinfect surfaces such as walls, floors, table-tops and the like in areas where the maintenance of sterile conditions is important, as for example, in hospitals, food preparation areas and the like.

Because of its activity against cariogenic organisms and those organisms implicated in the etiology of periodontal disease A477 can be incorporated in inhibitory concentrations in preparations employed in oral hygiene such as toothpastes and powders, mouthwashes and the like.

The ability of the antibiotic to stimulate weight gains in animals makes it especially useful for this purpose.

When used as a growth promoting agent, the antibiotic is conveniently incorporated into the normal food ration of the animals in suitable concentrations. Alternatively, a soluble salt of the antibiotic can be dissolved in the drinking water of the animals.

In any of the foregoing applications, the antibiotic can be employed either as the free base or as an acid addition salt, the choice being dictated by the physical characteristics of the antibiotic or by other factors, rather than the biological activities, which are the same for either the free base or the acid addition salts.

The novel antibiotic of this invention is produced by culturing an A477-producing strain of an Actinoplanes organism under submerged aerobic conditions in a suitable culture medium until the culture medium contains substantial antibiotic activity. The antibiotic can be recovered by employing various isolation and purification procedures commonly used and understood in the art.

The microorganism useful for the preparation of antibiotic A477 is a species of the genus Actinoplanes of the family Actinoplanaceae. The Actinoplanaceae are a newly characterized family of microorganisms of the order Actinomycetales having been first described by Couch [Jour. Elisha Mitchell Sci. Soc., 65, 315–318 (1949); 66, 87–92 (1950); Trans. New York Acad. Sci., 16, 315–318 (1954); Jour. Elisha Mitchell Sci. Soc., 71, 148–155 and 269 (1955); Bergey's Manual of Determinative Bacteriology, 7th ed., 825–829 (1957); Jour. Elisha Mitchell Sci. Soc., 79, 53–70 (1963)].

The Actinoplanes culture useful for the production of antibiotic A477 has been deposited without restriction and made a part of the stock culture collection of the Northern Utilization Research and Development Division, U.S. Dept. of Agriculture, Peoria, Ill. 61604, from which it is available to the public under the number NRRL 3884.

The methods employed in the taxonomic studies of the A477-producing strain of Actinoplanes are similar to those recommended by the International Streptomyces Project along with other supplementary tests commonly used in taxanomy (Shirling, E.B., and D. Gottlieb, 1966. Methods for Characterization of Streptomyces Species, International Bull. Systemic Bacteriol., 16:313–340). Color names were assigned according to the ISCC–NBS method (Kelly, K. L. and D. B. Judd, 1955, The ISCC–NBS Method of Designating Colors and a Dictionary of Color Names, U.S. Department of Commerce Circular Number 553, Washington, D.C.). The numbers in parentheses refer to color blocks in Maerz and Paul, Dictionary of Color, McGraw-Hill Book Company, Inc., New York.

MICROSCOPIC MORPHOLOGY

Vegetative mycelium is scant on Liquidamber (sweet gum tree) pollen in water. The palisade hyphae average 1.3 x 13μ with only occasional branching. Sporangia are produced sparsely on pollen and International Streptomyces Project No. 3 Medium (Shirling and Gottlieb). The sporangia are globose, averaging 7.5μ in diameter with an irregular surface. Spores are pyriform when observed on electron micrograps and are multifagellated and motile and measure 1.7 x 1.2μ.

CULTURAL CHARACTERISTICS

Observations were made after 21 days growth at 30° C. The designations ISP refer to International Streptomyces Project Media (Shirling and Gottlieb).

Yeast-malt agar (ISP No. 2): Growth abundant. Light brown (13F8). No soluble pigment.
Czapek's agar: Growth abundant. Medium orange (10F7). No soluble pigment.
Oatmeal agar (ISP No. 3): Growth fair, medium orange yellow (11B7). No soluble pigment.
Inorganic salts-starch (ISP No. 4): Growth abundant. Brownish orange. Light brown soluble pigment.

Glycerol-asparagine (ISP No. 5): Growth abundant. Medium orange (10P7). No soluble pigment.
Glycerol-glycine: Growth very scant. No soluble pigment.
Bennett's medium: Growth fair. Grayish reddish orange (11A8). No soluble pigment.
Tomato paste-oatmeal: Growth abundant. Brownish orange (12B9). Brown soluble pigment.
Tyrosine agar: Growth fair. Light grayish yellowish brown (13B3). No soluble pigment.
Yeast extract agar: Growth moderate. Strong yellowish brown (13H8). Brown soluble pigment.
Glucose-asparagine: Growth abundant. Pale orange yellow (9E7). No soluble pigment.
Calcium malate: Growth very scant. No soluble pigment.
Nutrient agar: Growth sparse. Pale orange yellow (12B3). Slight brown soluble pigment.
Emerson's agar: Growth moderate. Medium brown (7E11). Soluble pigment dark reddish brown.

Physiology

Skim milk: Neither coagulation nor clearing occurred after 21 days. Light brown pigment.
Nitrate reduction: Positive.
Nutrient gelatin: Complete liquefaction after 21 days.
Melanin production: Positive on peptone-iron agar (ISP Number 6) after 24 hours.

Temperature requirements

Glycerol-asparagine agar: Growth moderate to abundant from 26°–37° C. No growth at 43° C.

Table II summarizes the results of the carbon utilization tests carried out on the A477-producing strain of Actinoplanes sp. NRRL 3884. In the table, the symbols employed are interpreted as follows:

+ = utilization
(+) = probable utilization
(−) = questionable utilization
— = no utilization.

TABLE II

Carbon utilization of Actionoplanes sp. NRRL 3884

| Carbon source: | Response |
|---|---|
| Rhamnose | (+) |
| Cellobiose | (+) |
| Cellulose | — |
| i-Inositol | — |
| Melezitose | — |
| D-fructose | + |
| D-dextrose | + |
| d-Xylose | + |
| d-Mannitol | + |
| Raffinose | — |
| Sucrose | (−) |
| Maltose | (+) |
| L-arabinose | + |
| Lactose | + |

As previously noted, Actinoplanes sp. NRRL 3884 can be grown in a culture medium to produce antibiotic A477. The culture medium can be any one of a number of media; however, for economy of production, maximum yield, and ease of isolation of the antibiotic, certain culture media are preferred. Thus, for example, dextrose is one of the preferred sources of carbohydrate and soybean meal is one of the preferred nitrogen sources.

Nutrient inorganic salts to be incorporated in the culture medium can include the customary salts capable of yielding sodium, potassium, ammonium, calcium, phosphate, chloride, sulfate, acetate, carbonate, and like ions. Additionally, sources of growth factors such as distiller's solubles and yeast extracts can be included with beneficial results.

As is necessary for the growth and development of other microorganisms, essential trace elements should also be included in the culture medium for growing the Actinoplanes employed in this invention. Such trace elements are commonly supplied as impurities incidental to the addition of the other constituents of the medium.

The initial pH of the culture medium can be varied widely. However, prior to inoculation with the organism, it is desirable to adjust the pH of the culture medium to between pH 6.5 and 7.3 depending on the particular medium employed. The final pH is determined, at least in part, by the initial pH of the medium, the buffers present in the medium, and the period of time for which the organism is permitted to grow.

Preferably, submerged aerobic fermentation in large tanks is used for the production of substantial quantities of antibiotic A477. Small quantities of the antibiotic are obtained by shake flask culture. Because of the time lag in antibiotic production commonly associated with the inoculation of large tanks with the spore form of the organism, it is preferable to use a vegetative inoculum. The vegetative inoculum is prepared by inoculating a small volume of the culture medium with the spore form or mycelial fragments of the organism to obtain a fresh, actively growing culture of the organism. The vegetative inoculum is then transferred to the larger tank. The medium used for the growth of the vegetative inoculum can be the same as that employed for larger fermentations, although other media can be employed.

The A477-producing organism can be grown at temperatures between about 20°–40° C. Optimal A477 production appears to occur at a temperature of about 30° C.

As is customary in aerobic submerged culture processes, sterile air is blown through the culture medium. For efficient growth of the organism and A477 production, the volume of air employed in the tank production of A477 preferably is upwards of 0.1 volume of air per minute per volume of culture medium.

The production of antibiotic activity during the fermentation can be followed by testing samples of the fermentation broth for their antibiotic activity against organisms known to be sensitive to the antibiotic. One such assay organism useful in the present invention is Bacillus subtilis. The bio-assay can be carried out conveniently by the paper disc assay on agar plates.

Generally, maximum production of the antibiotic occurs within two to six days in large tank or shake flask fermentation. Commonly, maximum production of antibiotic activity is realized within 48 to 96 hours.

Antibiotic A477 can be recovered from the culture medium and separated from other substances which may be present by extractive and adsorptive techniques. Adsorption processes for the recovery of A477 are preferred at present because such procedures eliminate the relatively large volumes of solvents required when extractive techniques are employed. Carbon is a suitable adsorbent for separating the antibiotic from the filtered culture broth, atlhough other commonly used adsorbents are equally satisfactory. The antibiotic substance fixed on the adsorbing agent is recovered by customary elution procedures. For further purification of A477, adsorption and elution procedures using adsorptive materials such as polyamide resin, alumina, Sephadex G–50 and the like can be advantageously employed. Ion exchange resins may also be employed for the purification of A477.

This invention is further illustrated by the following examples, but is not to be construed as limited thereby.

EXAMPLE 1

(A) Shake flask fermentation of A477

A culture of Actinoplanes sp. NRRL 3884 was prepared and maintained on an agar slant having the following composition.

Ingredient:
- Pre-cooked oatmeal _____ g__ 60.0
- Yeast _____ g__ 2.5
- $K_2HPO_4$ _____ g__ 1.0
- Czapek's mineral stock [a] _____ ml__ 5.0
- Agar _____ g__ 25.0
- Deionized water _____ liter__ 1

[a] Czapek's mineral stock has the following composition.

Ingredient:
- KCl _____ 100 g.
- $MgSO_4·7H_2O$ _____ 100 g.
- $FeSO_4·7H_2O$ _____ 2 g. (dissolved in 2 ml. conc. HCl).
- Deionized water _____ 1 liter.

The pH of the medium was adjusted to pH 7.3 with sodium hydroxide solution. After sterilization by autoclaving at 120° C. for 30 minutes at 15–20 pounds pressure, the pH of the medium was 6.7.

The slant was inoculated with Actinoplanes sp. NRRL 3884 and incubated at 30° C. for seven to ten days. The mycelial growth was covered with sterile distilled water and the surface of the slant was scraped to loosen the organisms. Since the culture does not sporulate, it is desirable to macerate the mycelial mat with a flattened, sharpened inoculating needle in order to increase the number of potential growth centers. One-half of a slant culture so prepared was used to inoculate 50 ml. of a vegetative medium having the following composition.

Ingredient:
- Glucose _____ g__ 10.0
- Starch _____ g__ 20.0
- Nutrisoy flour [a] _____ g__ 20.0
- Yeast _____ g__ 2.0
- $CaCO_3$ _____ g__ 2.0
- Tap water _____ liter__ 1.1

[a] Available from Archer-Daniels-Midland Co., Decatur, Ill.

The inoculated vegetative medium was incubated for 72 hours at 30° C. on a rotary shaker operating at 250 r.p.m. Ten ml. of the fermentation mixture was used to inoculate 100 ml. of a second stage vegetative growth medium of the following composition.

Ingredient:
- Glucose _____ g__ 10.0
- Dextrin 700 [a] _____ g__ 20.0
- Nutrisoy flour _____ g__ 20.0
- Amber BYF 300 [b] _____ g__ 3.0
- $CaCO_3$ _____ g__ 4.0
- Tap water _____ liter__ 1.1

[a] Potato dextrin imported from Holland.
[b] Fraction of autolyzed brewer's yeast, Amber Laboratories, Juneau, Wis.

The inoculated medium was incubated for 48 hours at 30° C. on a rotary shaker (250 r.p.m.). This second stage vegetative medium was employed to inoculate 30 ml. of a sterile production medium of the following composition contained in a 250-ml. Erlenmeyer flask.

Ingredient: Percent
- Dextrose _____ 1.0
- Starch _____ 2.0
- Mannitol _____ 1.0
- Nutrisoy flour _____ 1.5
- Amber BYF 300 _____ 0.1
- $CaCO_3$ _____ 0.2
- Tap water to 1 liter.

The inoculated medium contained in the Erlenmeyer flask was allowed to ferment at 30° C. for 72–120 hours on a rotary shaker operating at 250 r.p.m. The terminal pH was 7.0–7.5.

(B) Tank fermentation of A477

The procedure described immediately above was followed through the preparation of the second stage vegetative medium. Two hundred milliliters of this vegetative medium was used to inoculate 25 liters of a sterile production medium of the following composition.

Ingredient: Percent
- Dextrose _____ 1.0
- Starch _____ 2.0
- Mannitol _____ 1.0
- Nutrisoy flour _____ 1.5
- Amber BYF 300 _____ 0.1
- $CaCO_3$ _____ 0.2
- Dow Corning antifoam _____ 0.02
- Water, 25 liters.

The pH of the medium was 7.3–7.4 after sterilization by autoclaving at 120° C. at 15–20 pounds pressure for 30 minutes. The inoculated production medium contained in a 45 liter fermentor was allowed to ferment at a temperature of 30° C. for five days. The fermentation was aerated with sterile air at a rate of one-half volume of air per volume of culture medium per minute. The fermentation was stirred with conventional agitators at 500 r.p.m.

(C) Isolation of A477

The whole fermentation broths from two twenty-five liter tanks grown according to the procedure described in the previous section were combined and 5 N sodium hydroxide was added to adjust the pH to pH 10.5. The whole broth was filtered using a filter aid and the mycelial cake was suspended in water and stirred for one hour. The mycelium was filtered and the mycelial cake discarded. The filtrates were combined, yielding a total volume of 66.5 liters. The pH of the pooled filtrates was adjusted to pH 8.0 with 3 N hydrochloric acid solution. The pooled filtrates were passed through a column loaded with Pittsburgh carbon (12 x 40 mesh) in water. The column was washed with 15 liters of water and the effluents were discarded. The column was then washed with 20 liters of an aqueous solution of hydrochloric acid at pH 2.5 and the effluent was also discarded. The carbon column was eluted with four liters of an acetone-water (1:1) solution which had been adjusted to pH 2.0 with 3 N hydrochloric acid. The pH of the eluate was adjusted to pH 7.5–8.0 with 5 N sodium hydroxide solution. The eluate containing the A477 activity was concentrated to a volume of 1700 ml. and the concentrated eluate was adsorbed onto a 7 x 60 cm. column containing water-washed polyamide resin (M. Woelm, Eschwege, Germany).

The polyamide resin column was eluted with eight liters of water and the eluate collected in multiple fractions. The fractions containing A477 activity were combined and concentrated to a small volume. Four volumes of methanol were added to the concentrate and thereafter an equal volume of ether to precipitate antibiotic A477. The antibiotic was filtered and dried to yield 1.1 g.

An additional quantity of A477 was recovered by eluting the polyamide column with a methanol:water solution (1:1). The eluates containing A477 activity were combined and concentrated to a small volume. Four volumes of methanol were added to the concentrate and the antibiotic was precipitated by the addition of an equal volume of ether. The precipitate was recovered by filtration and weighed 3.0 grams.

EXAMPLE 2

Purification of antibiotic A477 using alumina

The procedure described in Example 1, part (C), for the isolation of antibiotic A477 was followed through the elution of the Pittsburgh carbon column. The pH of the eluate was adjusted to pH 7.5–8.0 with 5 N sodium hydroxide solution and then was concentrated to a volume of 200 ml.

One hundred milliliters of this concentrated eluate containing the A477 activity was applied to a 2.7 x 80 cm. column containing acid-washed alumina (Aluminum Company of America) packed in water. The column was then washed with two liters of methanol. The methanol effluent was discarded. The A477 activity was eluted from the column with aqueous methanol (1:1) and the active fractions were combined and concentrated to dryness. The dried residue was dissolved in 100 ml. of aqueous methanol (1:1). The resulting solution was added to 2 liters of acetone in order to precipitate the purified A477. Yield: 2.2 g.

EXAMPLE 3

Preparation of A477 hydrochloride

Five hundred milligrams of A477, perpared according to the previous example, were dissolved in 20 ml. of 50% aqueous methanol. The solution was adjusted to pH 1.5 with 1 N HCl. The resulting solution was added with stirring to 400 ml. of acetone to precipitate the A477 hydrochloride salt. The resulting precipitate was recovered by filtration and dried.

The yield of A477 hydrochloride was 420 mg.

EXAMPLE 4

Preparation of A477 picrate

To a solution of 500 mg. of A477 in 20 ml. of water was added 20 ml. of saturated aqueous picric acid solution. The mixture was allowed to stand overnight at 5° C. A. yellow precipitate formed and was filtered to yield 505 mg. of the yellow A477 picrate.

EXAMPLE 5

Preparation of A477 hydrochloride from A477 picrate

To a solution of 505 mg. of A477 picrate salt in 25 ml. of methanol was added 1 N hydrochloric acid until the pH reached pH 1.5. The resulting acidic solution was added with stirring to 500 ml. of diethylether in order to precipitate the A477 hydrochloride. The precipitate so formed was filtered and dried to yield 442 mg.. of A477 hydrochloride.

EXAMPLE 6

Preparation of A477 free base from A477 hydrochloride

A solution of 500 mg. of A477 hydrochloride in 20 ml. of water was passed over an ion exchange resin (IR-45 (OH−)), contained in a 1 x 10 cm. glass column. The effluent was collected and the column eluted with water. The aqueous eluate and initial effluents were combined and evaporated in vacuo to dryness,. The residue was dissolved in 20 ml. of 50 percent aqueous methanol and added to 400 ml. of acetone with stirring to precipitate A477 free base.

The precipitate so formed was filtered and dried to yield 225 mg. of A477.

EXAMPLE 7

Preparation of A477 sulfate

A solution of 500 mg. of A477 hydrochloride in 20 ml. of water was passed over a 1 cm. x 10 cm. column containing an ion exchange resin (IR–45 in the hydroxyl cycle). The column was washed with water and the active fractions were combined and concentrated to dryness. The resulting dried residue was dissolved in 20 ml. of 50 percent aqueous methanol. The pH of the solution was adjusted to pH 1.5 with 1 N $H_2SO_4$ and the acidified solution was added to 400 ml. of acetone. A precipitate of A477 sulfate formed and was recovered by filtration. Yield, 331 mg.

EXAMPLE 8

Preparation of methyl orange salt of A477

To a solution of 500 mg. of A477 in 20 ml. water was added 20 ml. of a saturated solution of methyl orange in water. The resulting solution was allowed to stand overnight until precipitation of the A477 methyl orange salt was complete. The methyl orange salt of A477 was recovered by filtration and dried. Yield, 521 mg.

We claim:

1. The antibiotic A477 or the acid addition salts thereof, said antibiotic as the free base being a white amorphous solid having a specific rotation; $[\alpha]_D^{25}$ or −66.6 (c.=1% in 50% aqueous methanol); the approximate elemental composition of 53.06 percent carbon, 6.18 percent hydrogen, 5.79 percent nitrogen, 31.40 percent oxygen and 3.39 percent chlorine; which in the form of its hydrochloride salt is a white crystalline solid melting at 207 to 212° C.; which is soluble in warm water and in 50 percent aqueous methanol; which has four titratable groups two of which having pK'a values of 7.0 and 9.7 and two having pK'a values greater than 11 as determined by electrometric titration in 66 percent aqueous dimethylformamide; which has the approximate elemental composition of 55.36 percent carbon, 6.02 percent hydrogen, 5.73 percent nitrogen, 28.99 percent oxygen, 4.52 percent total chlorine and 1.28 percent inorganic chloride; which has an approximate molecular weight of 1480 as determined by vapor pressure osmometry; which as a mineral oil mull has the following distinguishable bands in its infrared absorption spectrum: 3.0, 5.8, 6.02, 6.3, 6.62, 6.84, 7.02, 7.26, 7.32, 7.7, 8.1, 8.27, 8.52, 8.97, 9.35, 9.7, 9.8 and 10.1 microns; which in aqueous acidic and neutral solution absorbs in the ultraviolet with an absorption maximum at $$283 \; m\mu \; E_{1cm.}^{1\%} \; 70$$

and which in aqueous basic solution absorbs in the ultraviolet with absorption maxima at $$300 \; m\mu, \; E_{1cm.}^{1\%} \; 60 \; \text{and} \; 362 \; m\mu, \; E_{1cm.}^{1\%} \; 53$$

2. A method of producing the antibiotic A477 defined in claim 1 which comprises cultivating Actinoplanes sp. NRRL 3884 in a culture medium containing assimilable sources of carbon, nitrogen, and inorganic salts under submerged aerobic conditions until a substantial amount of A477 is produced by said organism in said culture medium.

3. A method of producing the compound of claim 1 which comprises cultivating Actinoplanes sp. NRRL 3884 in a culture medium containing assimilable sources of carbon, nitrogen and inorganic salts under submerged aerobic conditions until a substantial amount of A477 is produced by said organism in said culture medium and recovering the A477 from said culture medium.

References Cited

UNITED STATES PATENTS 3,467,750  9/1969  Probst et al. _____ 424—118

JEROME D. GOLDBERG, Primary Examiner

U.S. Cl. X.R.

195—80; 424—119